March 3, 1959 — L. W. WRIGHT — 2,875,789
WATER SHOCK ABSORBER
Filed Nov. 26, 1957
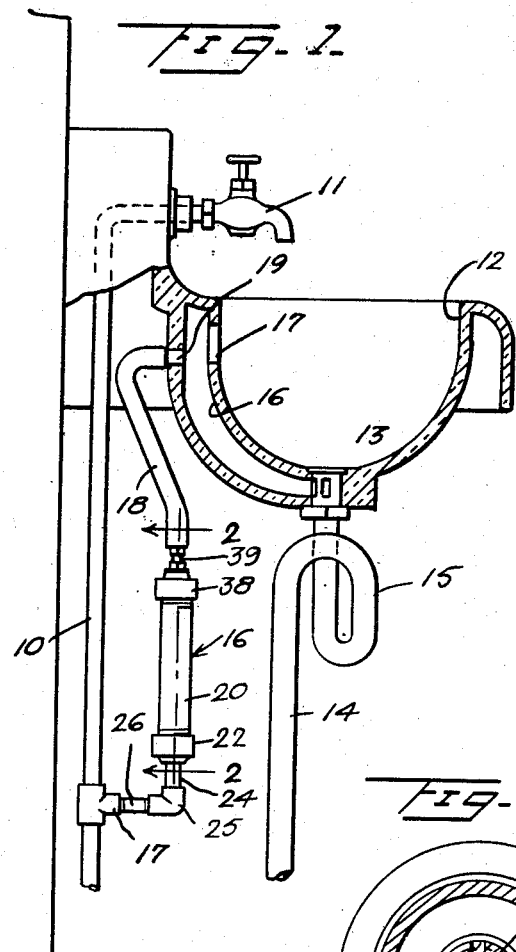
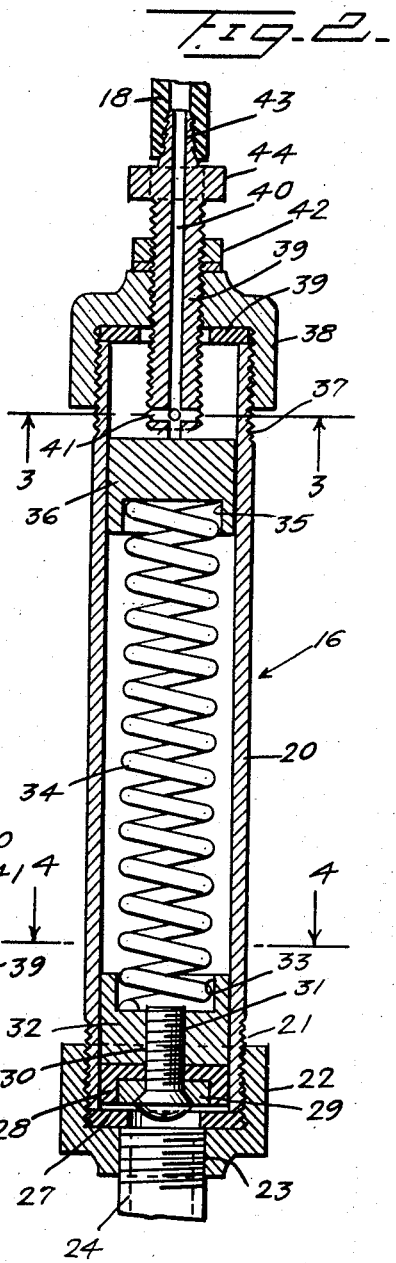
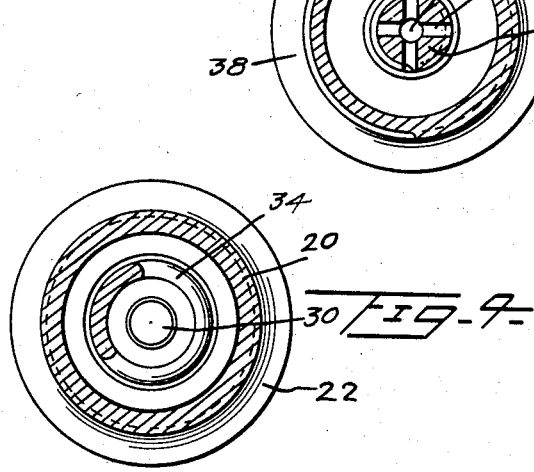
L. W. Wright
INVENTOR
BY C. A. Snowles
ATTORNEYS.

United States Patent Office 2,875,789
Patented Mar. 3, 1959

2,875,789
WATER SHOCK ABSORBER
Lawson W. Wright, Madison Heights, Va.
Application November 26, 1957, Serial No. 699,074
1 Claim. (Cl. 138—31)

This invention relates to a water shock absorber, or surge valve, and has its primary object the provision of an improved device of this character adapted to minimize knocking in water pipes or the like, by reducing the fluctuation due to pressure changes, in a hydraulic pressure system.

An additional object of the invention is to provide such a device which may be readily installed in any desired location, affording a shock absorbing connection between a water line and an outlet, which is normally closed, but which is opened upon an excess surge of pressure, such as would normally occasion knocking with a closed faucet or the like, to relieve the excess pressure in the line.

A further object of the invention is the provision of such a device which may be readily applied to an existing pipe or system, in any desired accessible location.

A further object of the invention is the provision of such a device which will be sturdy and durable in construction, reliable and efficient in operation, and relatively simple and inexpensive to manufacture, assemble and install.

Still other objects reside in the combination of elements, arrangements of parts, features of construction, all as will be more fully pointed out hereinafter, and disclosed in the accompanying drawing wherein there is shown a preferred embodiment of this inventive concept.

In the drawing:

Figure 1 is a side view, partially in section, and partially in elevation, showing one type of installation incorporating the water shock absorber or surge valve of the instant invention.

Figure 2 is an enlarged sectional view taken substantially along the line 2—2 of Figure 1, as viewed in the direction indicated by the arrows.

Figure 3 is an enlarged sectional view taken substantially along the line 3—3 of Figure 2 as viewed in the direction indicated by the arrows.

Figure 4 is a sectional view taken substantially along the line 4—4 of Figure 2 as viewed in the direction indicated by the arrows.

Similar reference characters refer to similar parts throughout the several views of the drawing.

Having reference now to the drawing in detail, and more particularly to Figure 1 there is disclosed at 10 a water inlet pipe, which leads to a faucet 11, which is superposed over, illustratively, a wash basin 12. The wash basin 12 is provided with the conventional drainage outlet 13, an outlet pipe 14, and includes the conventional gooseneck 15, or the like.

The device of the instant invention, is generally indicated at 16, and will be more fully described hereinafter. The device is connected between a T 17, associated with the water inlet pipe, and any desired locality in the outlet system of the basin 12. As herein disclosed, the connection is to the space 16 of the basin 12, which provides for drainage from the overflow slots 17, and is accomplished by means of a rubber tube 18, which engages a conventional tube connection 19 in the rear wall of the basin.

Having reference now in detail to the water shock absorber 16, it will be seen in Figure 2 that the device 16 includes an outer tubular casing 20, which is exteriorly threaded at its lower end as at 21 to accommodate an interiorly threaded metallic cap 22, which has a reduced lower outlet 23, for the reception of a pipe 24. The pipe 24 communicates with an L 25 (see Fig. 1) which in turn is communicated by means of a pipe 26 to the T 17 on the inlet water pipe 10.

Interiorly of the cup shaped head 22, there is provided a recess, which contains a rubber sealing gasket or washer 27, having a central opening which is normally closed by means of an inverted leather cup valve 28, having a centrally positioned brass washer 29. The washer 29 is apertured to receive a rounded headed screw 30, which threadedly engages a central threaded bore 31 of a floating plunger head 32. The head 32 is provided with a guide and centering recess 33 for the reception of one end of a relatively heavy brass spring 34. The other end of spring 34 is correspondingly centered in an oppositely disposed recess 35 carried by an opposite plunger head 36.

The opposite end of tube 20 is also threaded as at 37, and is engaged by a cup 38, which has corresponding internal threads, and which contains a sealing gasket 39.

The cap 38 is provided with an internally threaded bore which contains a threaded stem 39, which provides a tensioning member for the plunger including the spring 34. A vent tube 40 extends centrally through the stem 39, and opens at its lower end into cross vents 41. A lock nut 42 serves to hold the stem 39 in position. The outer end of the stem is provided with the conventional notched rubber tube connection 43, which is adapted in this instance to engage one end of the tube 18.

A second shoulder or lock nut 44, which may be either integral with or threaded on the stem 39 provides a seat for the end of the tube 18.

From the foregoing the operation of the device should be readily understandable. When air in inlet pipe 10 causes an excess of pressure, such pressure is transmitted through the T and bypassed to the lower end of the tube or cylinder 20, and is absorbed by the spring 39 in the plunger, any surplus air being vented through the passages 40 and 41. In this modification the tube 19 leading from the end of the cylinder is connected to an outlet, but it will be understood that this end of the device may, if desired, be opened to the air, since no water passes normally through or into the device.

It will further be understood that while there has been shown one specific application of this device, as applied to the inlet pipe to a wash basin, that it may be equally advantageously applied to any closable water inlet, such as to a sink, a bathtub, a toilet, an automatic electric washing machine, or any heating system, as may be desired.

It will also be seen that there is herein provided a device which accomplishes all of the objects of this invention, and others, including many advantages of great practical utility and commercial importance.

As various embodiments may be made of this inventive concept, and as various modifications may be made in the

What is claimed is:

In a device of the character described in combination, a tubular member, an apertured cap threaded on each end of said tubular member, a connection between a water inlet and the aperture in the lower of said caps, a leather cup washer in said tubular member adjacent said aperture in said lower cap, an upwardly recessed plunger head adjacent said cup washer, a screw securing said cup washer to said upwardly recessed plunger head, a downwardly recessed plunger head adjacent the upper of said caps, a compresssion spring seated in said recesses in said heads and extending therebetween, and an adjusting screw engaging in the aperture in said upper cup, abutting the end of said downwardly recessed plunger head, said adjusting screw having a vertical air vent therein and transverse vent means in said adjusting screw above said downwardly recessed plunger head communicating with said vertical air vent.

References Cited in the file of this patent
UNITED STATES PATENTS

| | | |
|---|---|---|
| 1,846,483 | Gilbert | Feb. 23, 1932 |
| 2,752,754 | Jaseph | July 3, 1956 |
| 2,789,581 | Kerr | Apr. 23, 1957 |